(12) United States Patent
Riekers et al.

(10) Patent No.: US 8,636,438 B2
(45) Date of Patent: Jan. 28, 2014

(54) FASTENING DEVICE

(75) Inventors: Ralf Riekers, Stuttgart (DE); Holger Prommersberger, Korntal-Munchingen (DE)

(73) Assignee: J. Eberspaecher GmbH & Co. KG, Esslingen (DE)

( * ) Notice: Subject to any disclaimer, the term of this patent is extended or adjusted under 35 U.S.C. 154(b) by 1292 days.

(21) Appl. No.: 11/787,298

(22) Filed: Apr. 16, 2007

(65) Prior Publication Data

US 2007/0258754 A1 Nov. 8, 2007

(30) Foreign Application Priority Data

May 8, 2006 (DE) .......................... 10 2006 021 641

(51) Int. Cl.
*F16C 11/04* (2006.01)

(52) U.S. Cl.
USPC .......................................... 403/220; 403/224

(58) Field of Classification Search
USPC .................... 248/60, 610, 613; 403/220–228
See application file for complete search history.

(56) References Cited

U.S. PATENT DOCUMENTS

| | | | | | |
|---|---|---|---|---|---|
| 1,864,080 | A | * | 6/1932 | Madge | 403/226 |
| 2,226,505 | A | * | 12/1940 | Saurer | 403/228 |
| 2,227,306 | A | * | 12/1940 | Guy | 248/613 |
| 2,267,431 | A | * | 12/1941 | Steensen | 248/60 |
| 2,969,656 | A | * | 1/1961 | Reuter | 403/223 |
| 3,292,887 | A | * | 12/1966 | Cassel et al. | 248/60 |
| 3,942,599 | A | * | 3/1976 | Shimada | 248/60 |
| 4,296,907 | A | * | 10/1981 | Ishida et al. | 248/610 |
| 4,550,795 | A | | 11/1985 | Teshima | |
| 5,398,907 | A | * | 3/1995 | Kelchner | 248/60 |
| 5,908,187 | A | * | 6/1999 | Kalkoske et al. | 248/60 |
| 6,758,300 | B2 | | 7/2004 | Kromis et al. | |
| 6,854,721 | B2 | | 2/2005 | Kato et al. | |
| 2003/0106735 | A1 | | 6/2003 | Bovio | |
| 2006/0266891 | A1 | * | 11/2006 | Stammel et al. | 248/60 |

FOREIGN PATENT DOCUMENTS

| | | |
|---|---|---|
| DE | 196212271 A1 | 7/1997 |
| DE | 19937488 A1 | 2/2001 |
| DE | 10019643 A1 | 10/2001 |
| DE | 10206742 A1 | 9/2002 |
| DE | 10307506 A1 | 8/2003 |
| DE | 10249498 B3 | 7/2004 |
| FR | 2674800 A1 | 10/1992 |
| FR | 2678221 | 12/1992 |

OTHER PUBLICATIONS

European Search Report dated Aug. 20, 2007.
German Search Report dated May 19, 2009 for related application No. 10 2006 021 641.5.

* cited by examiner

*Primary Examiner* — Victor MacArthur
(74) *Attorney, Agent, or Firm* — Howard IP Law Group, PC

(57) ABSTRACT

The invention relates to a device for fastening at least one component of an exhaust system to at least one member of a motor vehicle, including a component leg that is designed for rigid fastening to the at least one component of the exhaust system and one member leg that is designed for rigid fastening to the at least one member of the motor vehicle. A coupling body with or made of an elastomer is provided, the coupling body being connected on the one hand fixedly to the component leg and on the other hand being fixedly connected to the member leg.

2 Claims, 2 Drawing Sheets

FASTENING DEVICE

This application claims foreign priority of German Patent Application No DE 10 2006 021 641.5, filed May 8, 2006 in Germany, which application is incorporated herein by reference in its entirety.

FIELD OF THE INVENTION

The present invention relates to a device for fastening at least one component of an exhaust system to at least one member of a motor vehicle.

BACKGROUND OF THE INVENTION

A fastening device of this type is characterized in that it must absorb comparatively great relative movements between the respective component on the exhaust end and the respective member on the vehicle end in the longitudinal direction of the exhaust system and therefore must have a corresponding elasticity. Such relative movements occur due to thermal expansion effects caused by the heating of the exhaust system during operation of the vehicle. To this end, such a fastening device may have one component leg which is fixedly mounted on the respective component in the installed state and one member leg that is fixedly mounted on the respective member in the installed state. The two legs can then be attached to one another by means of a coupling body, so that they are spaced a distance apart in the connection direction. The legs are made of sheet metal, thus yielding the desired elasticity of the fastening device in the direction of the connection, which is parallel to the longitudinal direction of the exhaust system.

It has been found that fatigue develops in such a fastening device comparatively rapidly because of the loads acting on it during operation and is therefore damaged and ultimately destroyed.

SUMMARY OF THE INVENTION

The present invention relates to the problem of providing an embodiment for a fastening device of the type mentioned in the introduction, which is characterized by a longer lifetime in particular.

The invention is based on the general idea of furnishing the coupling body with an elastomer, e.g., designing it to be made of an elastomer. Due to this design, the coupling body can dampen rotational vibrations between the legs, which oscillate about the aforementioned direction of connection, for example. The present invention makes use of the finding that vibrations occur in an exhaust system during operation of the vehicle, leading to rotational vibrations in the area of the fastening device, with the coupling body acting as a pole. In the area of the resonant frequencies of the exhaust system and/or the respective component connected to the fastening device, said vibrations can achieve relatively high amplitudes, which lead to damage in the case of a rigid coupling body and/or a rigid fastening of the two legs to one another. Due to the use of an elastomer, the vibrations can be dampened, thereby withdrawing energy from the vibrating system. At the same time, the coupling body is elastic and is thus less susceptible to damage due to the torques and strains transmitted between the legs. The lifetime of the fastening device is thus greatly prolonged.

In an exemplary embodiment, since the coupling body is made of an elastomer, the fastener device operates as a vibration damper, also known as a damper for short. A damper is defined by a mass, a spring and a damper and is usually designed for damping certain vibration frequencies. In order for the fastening device to operate as a damper in the installed state, the spring and the damper are formed by the coupling body, i.e., the elastomer body, while the mass is formed by the at least one component of the exhaust system. Since the fastening device acts as a vibration damper, the oscillation amplitudes that occur can be reduced significantly, and hence a relatively greater amount of vibrational energy is withdrawn from the system. Consequently, the risk of overloading of the fastening device and the exhaust system is substantially reduced.

It is self-evident that the features mentioned above and those yet to be explained below may be used not only in the particular combination given but also in other combinations or alone without going beyond the scope of the present invention.

Exemplary embodiments of the invention are illustrated in the drawings and explained in greater detail in the following description, where the same reference numerals are used to refer to the same or similar or functionally identical components.

BRIEF DESCRIPTION OF THE DRAWINGS

In the figures, each shown schematically.

DETAILED DESCRIPTION OF THE INVENTION

Figure 1:
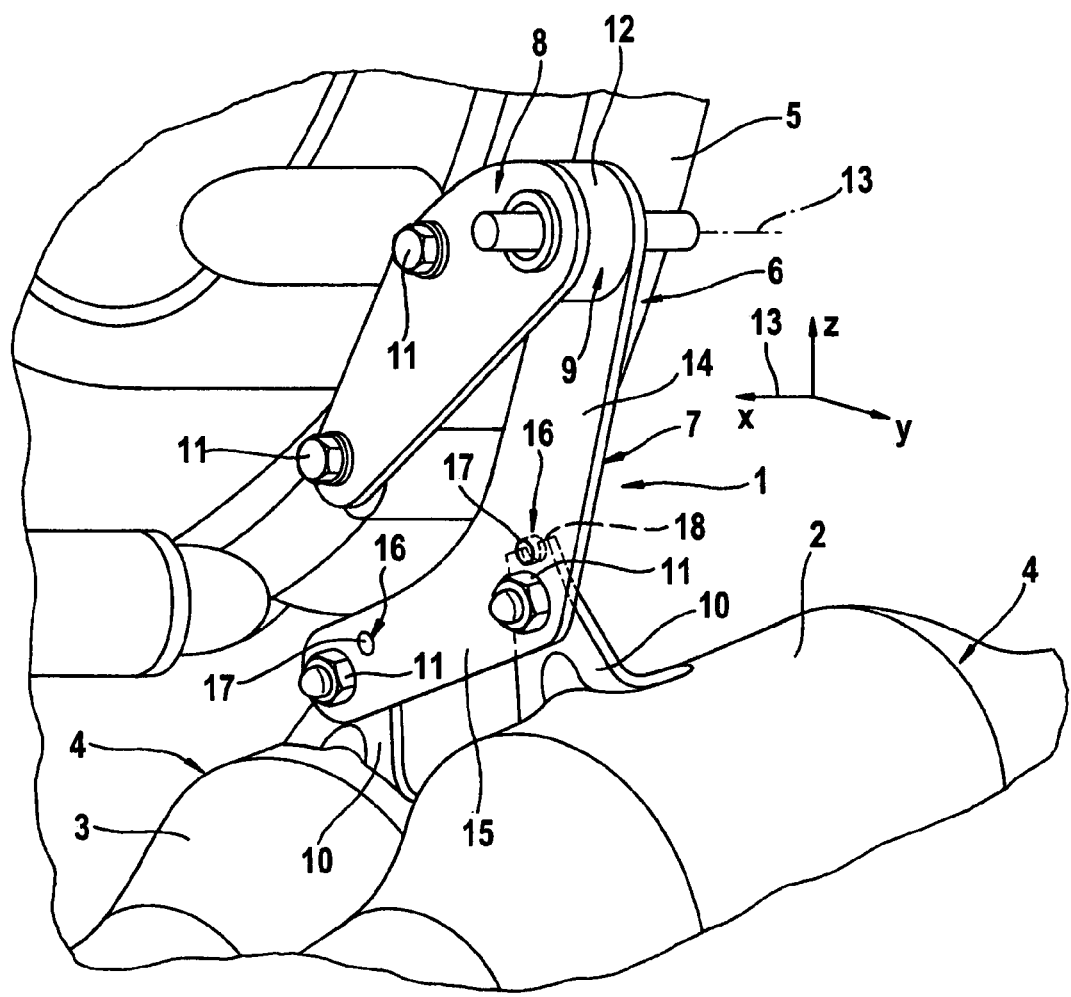
FIG. 1 shows a perspective view of a fastening device.

According to FIG. 1, a fastening device 1 with the help of which at least one of components 2, 3 of an exhaust system 4 can be attached to at least one member 5 of a motor vehicle 6, not otherwise shown here, includes a component leg 7, a member leg 8 and a coupling body 9. In the installed state shown here, the component leg 7 is rigidly or stiffly attached to the respective components 2, 3. The member leg 8 is rigidly or stiffly attached to the respective member 5 in the installed state. The two legs 7, 8 are attached to one another via the coupling body 9.

The components 2, 3 of the exhaust system 4 each may be a catalytic converter, for example. In the example shown here, the exhaust system 4 is designed with two lines of flow and accordingly has two exhaust lines through which exhaust gas can flow in parallel and each of which contains a catalytic converter 2, 3. The catalytic converters 2, 3 are arranged side-by-side in the area of the vehicle 6 shown in FIG. 1. With the help of the fastening device 1, the two catalytic converters 2, 3 can be mounted on the member 5 at the same time. To do so, each catalytic converter 2, 3 has a fastening console 10 by means of which the respective component 2, 3 is rigidly or stiffly attached to the component leg 7. The stiff or rigid attachment here is accomplished by means of screw connections 11.

The at least one member 5 of the vehicle 6 may be, for example, a transmission and/or a transmission section, in particular a so-called bell-type transmission gear. Here again, the rigid or stiff fastening between the member 5 and the member leg 8 can be implemented by screw connections 11.

The coupling body 9 is made of an elastomer which is labeled below as 12. The elastomer 12 or the elastomer body 12 is on the one hand fixedly connected to the component leg 7 and on the other hand fixedly connected to the member leg 8.

The two legs 7, 8 are each in the form of sheet metal or they are flat in the exemplary embodiment shown here and they may be shaped so that they each extend in a plane. The plane extends across a direction of connection as indicated by an arrow 13 in the figures. This direction of connection 13 may run parallel to a longitudinal direction of the exhaust lines of the exhaust system 4, which serves as the x direction in a Cartesian coordinate system. Consequently, the planes in which the sheet metal legs 7, 8 extend are the y-z planes of the aforementioned coordinate system. The legs 7, 8 are made of sheet metal or they are flat because they are dimensioned to be smaller in the direction of their thickness than across their thickness. In the connection direction 13, the coupling body 9 connects the two legs 7, 8 to one another. At the same time, the coupling body 9 in said connection direction 13 causes a space to be formed between the two legs 7, 8. Due to the sheet metal design of the legs 7, 8 and their y-z orientation, the fastening device 1 may already absorb relative movements in the x direction between the exhaust system 4 and the vehicle 6 via the legs 7, 8. Such relative movements result from thermally induced changes in length of the exhaust system 4 which heats up greatly during operation. To achieve the desired flexibility of the fastening device 1 in the x direction, in the present case the component leg 7 has a connecting section 14, which connects the coupling body 9 to a binding section 15 of the component leg 7 and thereby bridges the distance between the components 2, 3 and the member 5. Due to the elastomer 12, the elasticity of the fastening device 1 for the relative adjustments between the components 2, 3 and the member 5 oriented in the x direction is improved.

During operation of the vehicle 6, vibrations may occur within the exhaust system 4, manifested in the area of the fastening device 1, e.g., in the form of rotational vibrations in which the legs 7, 8 execute an oscillating motion in relation to one another and with the coupling body 9 as a vibration pole, e.g., oscillating around the connection direction 13. The coupling body 9 also allows such rotational vibrations because of the elastomer 12. However, the elastomer 12 has a damping effect on such rotating vibrations. This means that because of the deformation associated with the rotational vibration in elastomer 12, vibrational energy is dissipated into thermal energy, so the vibration system loses energy. The vibration amplitudes that occur are therefore reduced. At the same time, the risk of damage to the fastening device 1 is reduced because of the elasticity of the elastomer 12. In this context, considerable stresses due to load surges because of road surface excitation and thermal stresses that are absorbed by the elastomer 12 with damping can also be mentioned in this context.

In one embodiment the coupling body 9 and/or the elastomer 12 is/are designed so that in the installed state, the fastening device 1 cooperates with the at least one component 2, 3 attached to it to act as a vibration damper, known simply as a damper. The coupling body 9 and/or the elastomer 12 forms the spring and the vibration damper forms the damper, while the components 2, 3 connected to the member 5 via the fastening device 1 form the mass of the damper. The fastening device 1 and/or its elastomer 12 is thus designed for the vibration system formed by the exhaust gas system 4 and in fact does so in a targeted manner, so that the components 2, 3 attached to the member 5 via the fastening device 1 form dampers together with the fastening device 1. Subsequently, vibration states that show vibration surges in the area of components 2, 3 can be damped intensely so that their amplitudes are drastically reduced. Subsequently the load on the fastening device 1 is reduced significantly, so that its durability is prolonged accordingly. With the fastening device 1 that functions as a vibration damper, the elastomer 12 and/or the coupling body 9 serves not only as a damper but instead it additionally functions as a spring within the vibration damper and allows the desired damping effect through appropriate dimensioning.

The vibration damper is designed for damping rotational vibrations oscillating around the pole, i.e., around the coupling body 9. In addition said vibration damper may be designed for damping oscillation frequencies with which the at least one component 2, 3 oscillates in the in the event of resonance. Vibrations in the resonance range may lead to especially great amplitudes, which consequently have an especially great destructive force. Through targeted design of the coupling body 9 and/or the elastomer 12 to create a vibration damper which manifests its preferred damping effect especially in such resonance cases, the risk of damage can be greatly reduced.

According to FIG. 1, the member leg 8 is attached to the member 5 by at least two fastening points at a distance from one another, namely by means of the screw connections 11. In this way, the member leg 8 is supported by means of the aforementioned fastening points 11 with respect to torques around the connecting direction 12 coaxially with the coupling body 9. The component leg 7 is also supported on the respective component 2 to prevent torque about the connecting direction 13. To this end, a torque supporting point 16 is provided for each fastening point, i.e., each screw connection 11. Such a torque supporting point 16 includes as an example a first element, e.g., a pin 17 which protrudes away from the component leg 7 and is supported coaxially with the coupling body 9 on a second component in the direction of the torque, i.e., with respect to rotation about the connection direction 13, the second component being formed here by a fork 18, for example, which is designed on the respective console 10 and with which the pin 17 engages.

Figure 2:
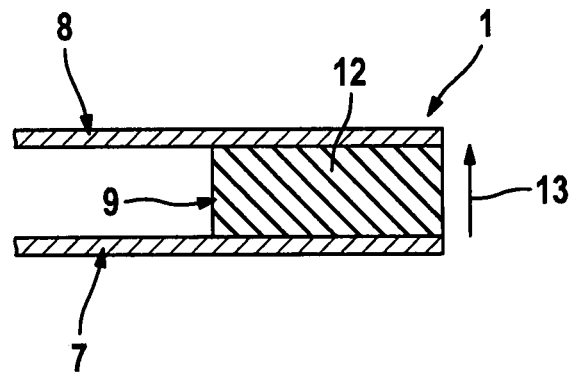
FIGS. 2 through 4 show partial sectional views of a partial area of the fastening device in various embodiments.

According to FIG. 2, the coupling body 9 may be made exclusively of the elastomer 12 in a simple embodiment. In this embodiment, the elastomer 12 is vulcanized onto both legs 7, 8. Alternatively, the elastomer 12 may also be integrally cast or molded on at least one of the legs 7, 8.

Figure 3:
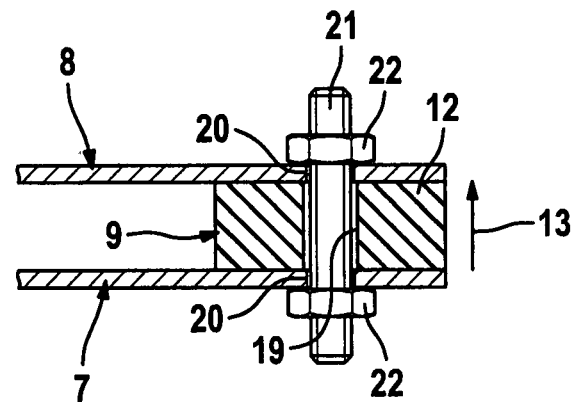

In the embodiment shown in FIG. 3, the coupling body 9 has a through-opening 19 in its elastomer 12. A securing element 21 is passed through the through-opening 19 and through corresponding openings 20, which are formed in the legs 7, 8 so they are flush with the through-opening 19. The securing element 21 consists of a threaded rod, for example. The securing element 21 serves to connect the two legs 7, 8 together in a loss-proof manner. To do so, the securing element 21 is screwed against the legs 7, 8 with two nuts 22, for example. The nuts 22 may be rotationally secured. In particular, no axial bracing is required. The securing element 21 is secured on the legs 7, 8 so that it is not involved at all or is involved only insignificantly in the transfer of torque between the legs 7, 8 about the coupling body 9 acting as a pole. The insignificant or minor involvement in the transfer of torque can be seen in comparison with the coupling body 9, which implements exclusively or almost exclusively a transfer of torque between the legs 7 and 8. The securing element 21 is provided for the case when the elastomer 12 is damaged and can no longer supply the required holding force between the legs 7, 8. Again in the embodiment according to FIG. 3, the elastomer 12 is integrally cast or molded or vulcanized onto at least one of the legs 7, 8.

Figure 4:
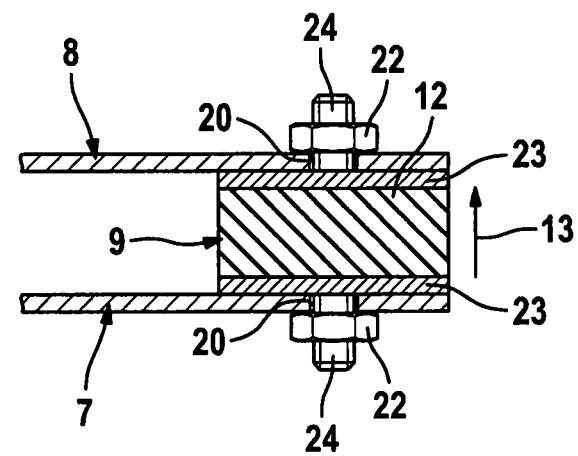

In the embodiment shown in FIG. 4, the coupling body 9 has a disk 23 and a bolt 24 protruding away from the disk 23 on each end face. The bolt 24 may be a threaded bolt and is connected to the disk 23 in a rotationally fixed manner. The respective bolt 24 passes through the respective leg 7, 8 back into an opening 20 and is fixedly screwed into the respective leg 8 by means of a nut 22. In contrast with the screw connections shown in FIG. 3, the screw connections shown in FIG. 4 are also designed fixedly, so that an adequate transfer of torque can be implemented between the legs 7, 8.

In the embodiments shown here, the elastomer 12 has a cylindrical outside contour. In addition, the elastomer 12 is designed as a ring-shaped body in the embodiment shown in FIG. 3, whereas in the other embodiments it is designed as a solid body. The thickness of the elastomer 12 in the x-direction and/or in the connecting direction 13 may amount to between 2 mm and 20 mm. The elastomer 12 may be produced on a silicone basis. Other plastics, e.g., plastics based on rubber or a VMO plastic are also possible. For example, the following rubbery materials are conceivable for the elastomer 12: silicone that is stable up to 200° C., EPDM or natural rubber that is stable to 120° C. or up to 150° C. In addition, the elastomer 12 is preferably designed to have a Shore hardness of 20 ShA to 150 ShA, preferably 60 ShA to 120 ShA.

What is claimed is:

1. A device for fastening at least one component of an exhaust system on at least one member of a motor vehicle, said device comprising:
 a component leg that is adapted for rigid fastening on the at least one component of the exhaust system;
 a member leg that is adapted for rigid fastening on the at least one member of the motor vehicle; and
 a coupling body having a first end and a second end opposite the first end, said coupling body fixedly connected to the component leg at the first end of the coupling body and fixedly connected to the member leg at the second end of the coupling body,
 wherein said coupling body comprises an elastomer,
 wherein the at least one component of the exhaust system extends in a first longitudinal direction of the exhaust system,
 wherein the component leg is a flat, planar member extending in a plane across the first longitudinal direction, and
 wherein the member leg is a flat, planar member extending in another plane across the first longitudinal direction.

2. The fastening device according to claim 1, the coupling body extends in a second direction parallel to the first longitudinal direction, and wherein the coupling body causes a space to be formed between the member leg and the component leg along the second direction.

\* \* \* \* \*